US008930599B2

(12) United States Patent
Lai et al.

(10) Patent No.: US 8,930,599 B2
(45) Date of Patent: Jan. 6, 2015

(54) DATA TRANSMISSION SYSTEM AND METHOD THEREOF

(71) Applicant: Via Technologies, Inc., New Taipei (TW)

(72) Inventors: Jiin Lai, New Taipei (TW); Buheng Xu, Beijing (CN); Jinkuan Tang, Beijing (CN)

(73) Assignee: Via Technologies, Inc., New Taipei (TW)

( * ) Notice: Subject to any disclaimer, the term of this patent is extended or adjusted under 35 U.S.C. 154(b) by 0 days.

(21) Appl. No.: 14/048,388

(22) Filed: Oct. 8, 2013

(65) Prior Publication Data

US 2014/0047142 A1  Feb. 13, 2014

Related U.S. Application Data

(63) Continuation of application No. 12/862,134, filed on Aug. 24, 2010, now Pat. No. 8,656,074.

(30) Foreign Application Priority Data

Mar. 8, 2010 (CN) .......................... 2010 1 0129143

(51) Int. Cl.
| | |
|---|---|
| G06F 13/12 | (2006.01) |
| G06F 13/38 | (2006.01) |
| G06F 13/00 | (2006.01) |
| G06F 11/08 | (2006.01) |

(52) U.S. Cl.
CPC ............. *G06F 13/385* (2013.01); *G06F 13/00* (2013.01); *G06F 13/12* (2013.01); *G06F 11/08* (2013.01)
USPC ........................................... 710/63; 717/138

(58) Field of Classification Search
None
See application file for complete search history.

(56) References Cited

U.S. PATENT DOCUMENTS

| | | | | |
|---|---|---|---|---|
| 6,948,025 | B2 * | 9/2005 | Yoshida ........................ | 710/315 |
| 7,096,289 | B2 * | 8/2006 | Brown et al. ................. | 710/107 |
| 7,316,009 | B2 * | 1/2008 | Peck ............................. | 717/138 |
| 7,383,372 | B2 * | 6/2008 | Tjia et al. ..................... | 710/315 |

(Continued)

FOREIGN PATENT DOCUMENTS

CN  1661867  8/2005

OTHER PUBLICATIONS

"Universal Serial Bus Specification Revision 2.0," USB Implementers Forum; Universal Serial Bus Specification; Apr. 2000; pp. 16-342.

*Primary Examiner* — Elias Mamo
(74) *Attorney, Agent, or Firm* — McClure, Qualey & Rodack, LLP

(57) ABSTRACT

A data transmission system and method are provided. The data transmission method receives a second format data packet sent by a host; decodes the second format data packet sent by the host, and translating the decoded second format data packet into a first format data packet; transmits the first format data packet to a first device; receives a transmission response sent by the first device in response to the first format data packet, determines whether to transmit the transmission response to the host, and performs a re-try flow when the transmission response does not need to be transmitted to the host. Preferably, a data transmission rate of the first device is slower than that of a second device, and the data transmission system is backward compatible to the first device, and the second format data packet is consistent with the second device.

18 Claims, 6 Drawing Sheets

(56) References Cited

U.S. PATENT DOCUMENTS

| | | | |
|---|---|---|---|
| 7,383,547 B1* | 6/2008 | Miri | 718/100 |
| 7,467,244 B2 | 12/2008 | Kamphausen et al. | |
| 8,306,061 B2* | 11/2012 | Lee et al. | 370/473 |
| 2003/0177294 A1* | 9/2003 | Russell | 710/62 |
| 2005/0038911 A1* | 2/2005 | Watanabe et al. | 709/246 |
| 2005/0138229 A1* | 6/2005 | Sartore | 710/15 |
| 2006/0053244 A1 | 3/2006 | Fruhauf et al. | |
| 2006/0064521 A1 | 3/2006 | Lin | |
| 2007/0011375 A1* | 1/2007 | Kumar | 710/106 |
| 2009/0210637 A1 | 8/2009 | Yung et al. | |
| 2009/0248389 A1 | 10/2009 | Roth | |

* cited by examiner

DATA TRANSMISSION SYSTEM AND METHOD THEREOF

CROSS REFERENCE TO RELATED APPLICATIONS

This application is a Continuation of patent application Ser. No. 12/862,134, filed on Aug. 24, 2010 (now U.S. Pat. No. 8,656,074), which claims priority of China Patent Application No. 201010129143.4, filed on Mar. 8, 2010, the entirety of which is incorporated by reference herein.

BACKGROUND OF THE INVENTION

1. Field of the Invention

The invention relates to a data transmission system and method, and more particularly to a data transmission system and method for a serial transmission device.

2. Description of the Related Art

A Universal Serial Bus (USB) is widely used in various electronic devices for data transmission between a host and peripheral devices. A USB 1.0 standard provides 1.5 Mbps (low-speed) and 12 Mbps (full-speed) data rates. A USB 2.0 standard provides 480 Mbps (high-speed) data rates. A USB 3.0 standard is presently being promoted, which provides 4.8 Gbps (super speed) data rates. Please refer to the "Universal Serial Bus 3.0 Specification" for further detail.

In a USB 2.0 protocol, a USB 2.0 HUB is compatible with a USB 1.0 device. FIG. 1 shows a schematic illustrating a USB 3.0 system with a USB 2.0 HUB and a USB 3.0 HUB. However, in a USB 3.0 protocol, no stipulation is made for a USB 3.0 HUB to be compatible with a USB 2.0 device. Thus a USB 2.0 device 111 can only use a USB 2.0 protocol to perform data transmission for the host 107 via the USB 2.0 HUB 101. Thus, a USB 2.0 device can not use a higher speed to perform data transmission for a host, even though a system thereof supports the USB 3.0 protocol for data transmission. Thus, it is a hindrance for improving performance of a USB 3.0 system, that the USB 2.0 device can not use a USB 3.0 bandwidth, which is 10 times that of a USB 2.0. Therefore, a data transmission system and method thereof for translating a USB 2.0 device into a USB 3.0 device is desired, so as to increase data transmission rate of the USB 2.0 device within a USB 3.0 system and performance of the USB 3.0 system.

BRIEF SUMMARY OF THE INVENTION

A data transmission system and method thereof are provided. An embodiment of a data transmission system includes a first control circuit coupled to a first device, a translation circuit coupled to the first control circuit, and a second control circuit coupled to the translation circuit. The first control circuit decodes a first format data packet sent by the first device. The translation circuit receives the decoded first format data packet and translates the decoded first format data packet into a second format data packet. The second control circuit transmits the second format data packet to a host. A data transmission rate of the first device is slower than that of a second device, and the data transmission system is backward compatible to the first device.

Furthermore, an embodiment of a data transmission method is provided. A first format data packet sent by the first device is decoded. The decoded first format data packet is received and translated into a second format data packet. The second format data packet is transmitted to a host. A data transmission rate of the first device is slower than that of a second device, and the data transmission system is backward compatible to the first device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
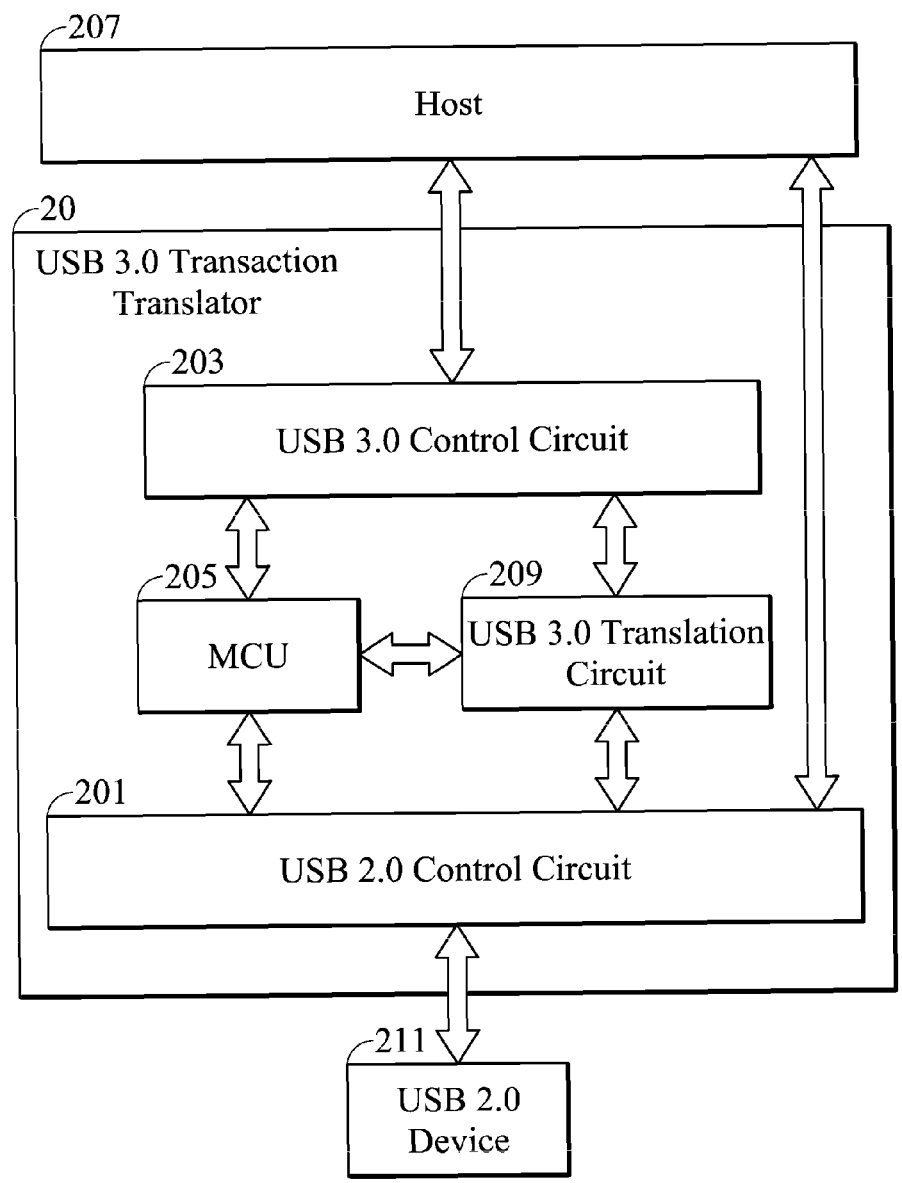
FIG. 2 shows a USB 3.0 transaction translator according to an embodiment of the invention.

FIG. 2 shows a USB 3.0 transaction translator according to an embodiment of the invention. As shown in FIG. 2, the USB 3.0 transaction translator 20 includes a USB 2.0 control circuit 201, a Micro Control Unit (MCU) 205, a USB 3.0 translation circuit 209 and a USB 3.0 control circuit 203. The USB 2.0 control circuit 201 is coupled to a USB 2.0 device 211 outside of the USB 3.0 transaction translator 20, wherein the USB 2.0 control circuit 201 is configured to measure data transmission rate of the USB 2.0 device 211, decode the USB 2.0 format data sent by the USB 2.0 device 211 and manage data transmission between the USB 3.0 translation circuit 209 and the USB 2.0 device 211. The USB 3.0 translation circuit 209 is coupled to the USB 2.0 control circuit 201, which is configured to perform protocol convert, i.e. translating a USB 2.0 format data to be translated into the USB 3.0 format, translating a USB 3.0 format data to be translated into the USB 2.0 format, registering the data to be translated and so on. The USB 3.0 control circuit 203 is coupled to the USB 3.0 translation circuit 209, which is configured to perform an emulation flow of a USB 3.0 device, so as to confirm correct connection of the USB 3.0 device and manage data transmission between the USB 3.0 translation circuit 209 and a host 207. The MCU 205 is coupled to the USB 2.0 control circuit 201, the USB 3.0 translation circuit 209 and the USB 3.0 control circuit 203, which is configured to control data transmission between the circuits. In one embodiment, other logic circuits may be configured to couple the USB 2.0 control circuit 201, the USB 3.0 translation circuit 209 and the USB 3.0 control circuit 203 for controlling the data transmission between the circuits.

Figure 1:
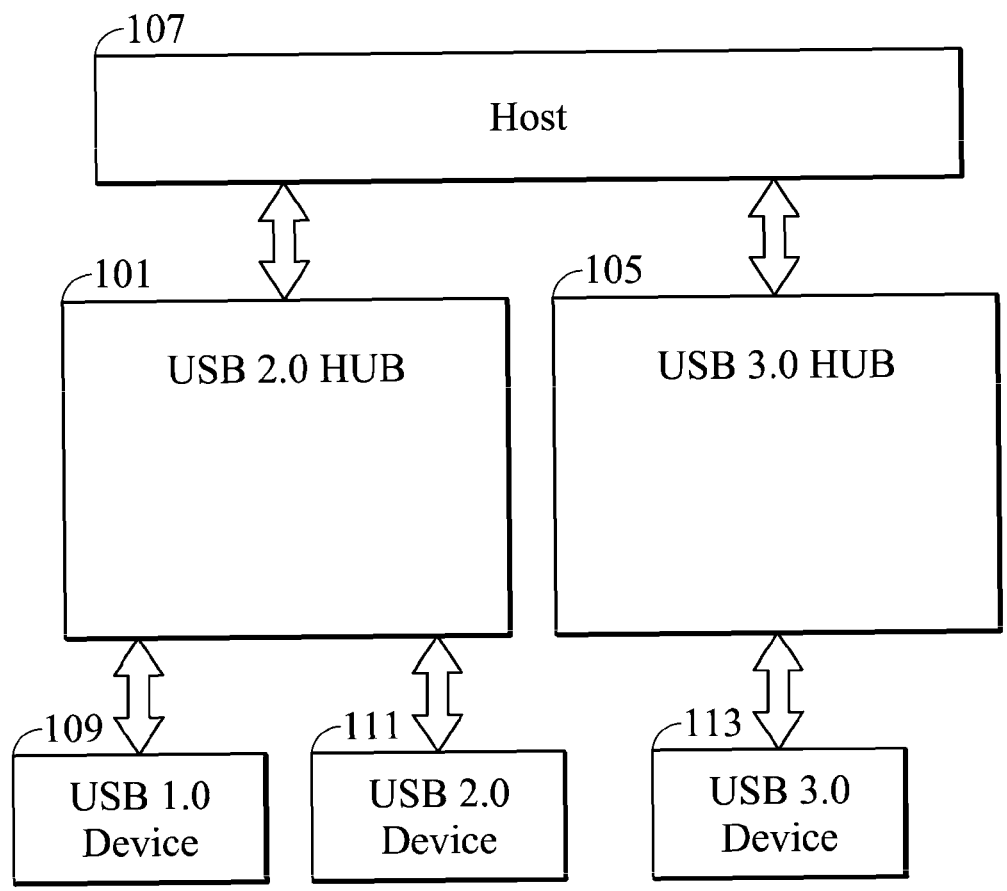
FIG. 1 shows a schematic illustrating a USB 3.0 system with a USB 2.0 HUB and a USB 3.0 HUB.

In one embodiment, each USB 2.0 device 211 corresponds to a corresponding USB 3.0 transaction translator 20 which manages data transmission between the USB 2.0 device 211 and the host 207. The USB 3.0 transaction translator 20 and the USB 3.0 HUB 105 of FIG. 1 are independent elements. In another embodiment, the USB 3.0 transaction translator 20 may be implemented in the USB 3.0 HUB 105 of FIG. 1, which is capable of performing translations for a plurality of USB 2.0 devices.

In one embodiment, the USB 3.0 translator is coupled between a USB 1.0 device and a host for translating the USB 1.0 device (includes low-speed and full-speed) into a USB 3.0 device, so as to transmit the data of the USB 1.0 device with a higher speed in a USB 3.0 system.

Figure 3:
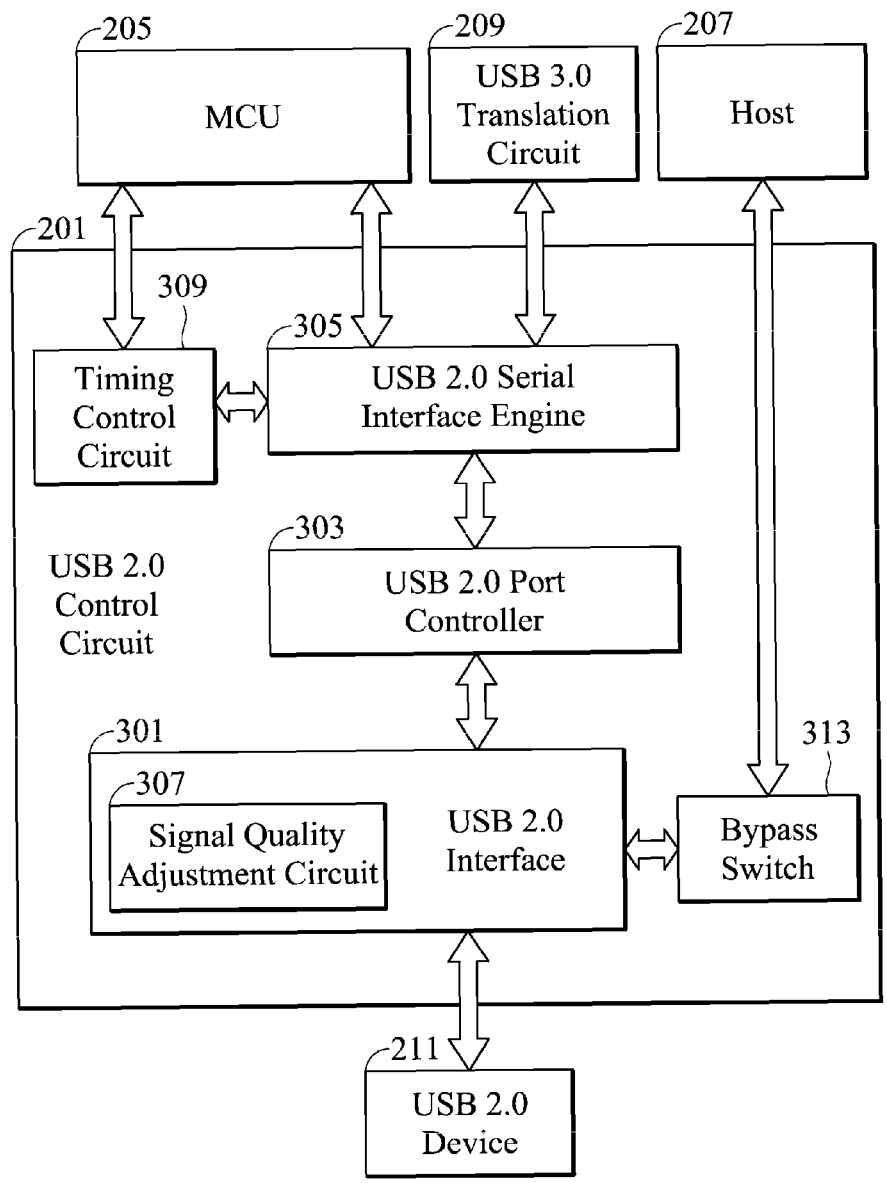
FIG. 3 shows a schematic illustrating the USB 2.0 control circuit of FIG. 2.

FIG. 3 shows a schematic illustrating the USB 2.0 control circuit 201 of FIG. 2. As shown in FIG. 3, the USB 2.0 control circuit 201 includes a USB 2.0 interface 301, a USB 2.0 port controller 303, a USB 2.0 serial interface engine 305 and a bypass switch 313. The USB 2.0 interface 301 is coupled to the USB device 211 for managing data transmission between the USB 2.0 control circuit 201 and the USB 2.0 device 211.

A host is usually compatible with various USB devices. Thus, the signal quality output by a host is guaranteed to perform normal communication operations for most USB devices. However, a host can not provide the best signal link for each USB device. In one embodiment, when each USB 2.0 device 211 corresponds to a corresponding USB 3.0 transaction translator 20, the USB 2.0 interface 301 includes a corresponding signal quality adjustment circuit 307 which adjusts the signal quality of data transmission according to a specific condition of the USB 2.0 device 211 coupled to the USB 3.0 transaction translator 20. For example, the signal quality adjustment circuit 307 may program the signal parameters of the USB 2.0 device under control of the MCU 205, such as rising time and falling time of the signals, parameters of the clock recovering circuit and so on, so as to stabilize the interface transmission between the USB 2.0 control circuit 201 and the USB 2.0 device 211 and decrease transmission error. The signal quality adjustment circuit 307 may increase the transmission rate of the USB 2.0 device, such that the actual transmission rate is further enhanced for the USB 2.0 device.

In general systems, transmission intervals of various data packets are fixed, such as 5 us, as each host corresponds to a plurality of USB devices. Since the transmission intervals of various data packets are fixed, the packets are only transmitted with the fixed interval. Thus, performance of data transmission can not be improved. If the coupled USB device has a slower data transmission rate, such as packet time intervals of 7 us, the coupled USB device would not be ready for a next packet transmission after 5 us and the coupled USB device would send a not ready signal. Following, the host would perform a re-try process for packet transmission at a later time interval, such as 10 us, thus worsening data transmission performance. In one embodiment, each USB 2.0 device 211 corresponds to a corresponding USB 3.0 transaction translator 20, and the USB 2.0 interface 301 further includes a timing control circuit 309. The timing control circuit 309 couples the USB 2.0 serial interface engine 305 and programs the time intervals for packet transmission according to a specific condition of the USB 2.0 device 211 coupled to the USB 3.0 transaction translator 20 under control of the MCU 205, thus increasing data transmission performance. Simultaneously, the timing control circuit 309 may program the time interval for receiving the not ready signal to perform the re-try process of the data packet transmission for the host, so as to decrease the idle waiting time for a device, and improve data transmission performance. In one embodiment, the timing control circuit 309 is implemented in the USB 2.0 serial interface engine 305.

The USB 2.0 port controller 303 is coupled to the USB 2.0 interface 301, which is configured to measure data transmission rate of the USB 2.0 device. The USB 2.0 serial interface engine 305 is coupled to the USB 2.0 port controller 303, wherein the USB 2.0 serial interface engine 305, under control of the MCU 205, may send data to the USB 2.0 device 211 and decode the USB 2.0 format data sent by the USB 2.0 device 211.

The bypass switch 313 is coupled to the USB 2.0 interface 301. When the USB 3.0 transaction translator 20 does not support the USB 2.0 device 211, the USB 2.0 device 211 is coupled to the bypass switch 313 via the USB 2.0 interface 301 and then directly coupled to the host 207 through the bypass switch 313. At this time, the USB 2.0 device 211 can not be translated into a USB 3.0 device by the USB 3.0 transaction translator 20, and the USB 2.0 device 211 can only use the USB 2.0 protocol to perform data transmission. In one embodiment, the USB 3.0 transaction translator 20 does not support the USB 2.0 device 211 when the USB 2.0 device 211 is a USB 2.0 HUB.

Figure 4:
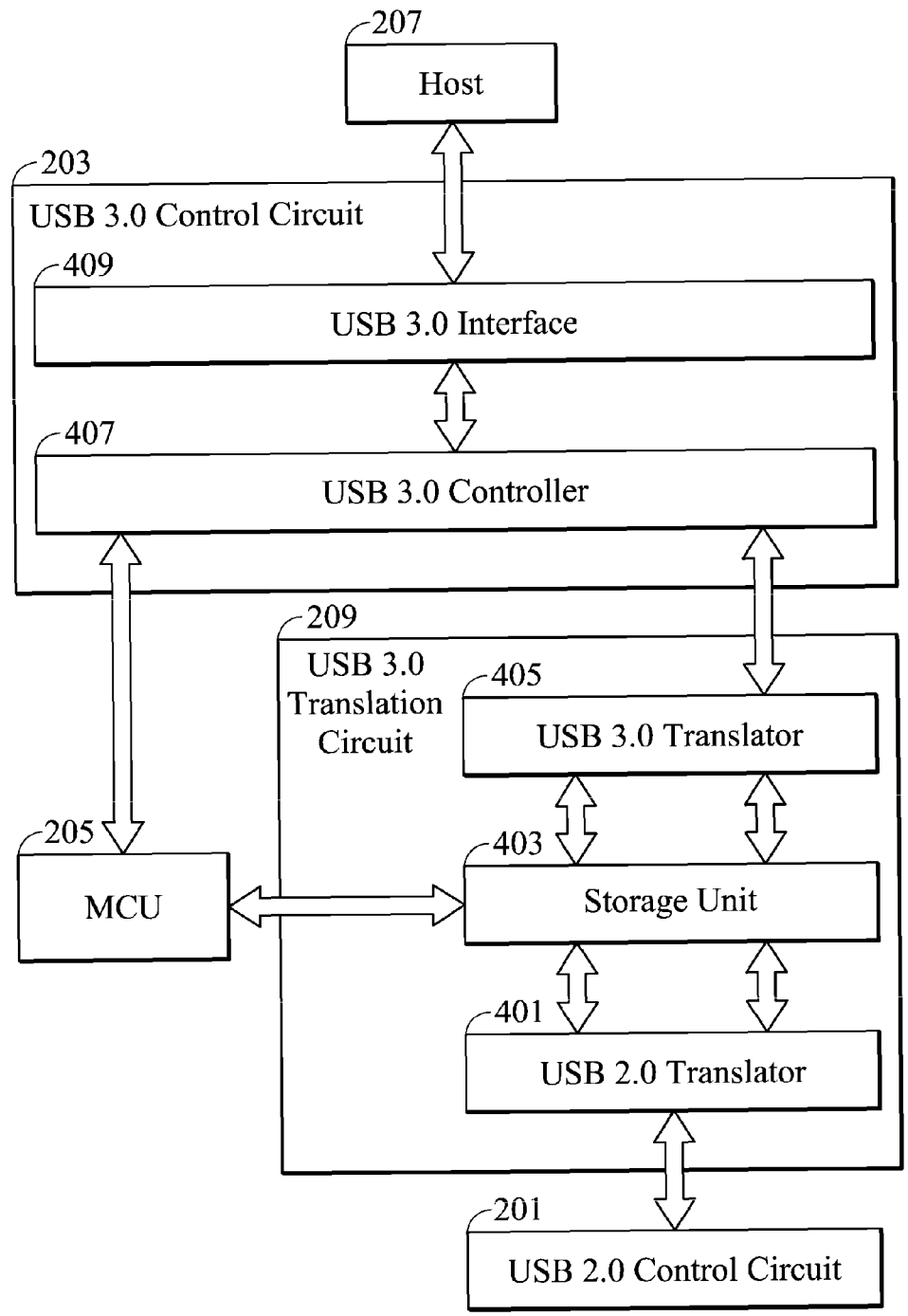
FIG. 4 shows a schematic illustrating the USB 3.0 translation circuit and the USB 3.0 control circuit of FIG. 2.

FIG. 4 shows a schematic illustrating the USB 3.0 translation circuit 209 and the USB 3.0 control circuit 203 of FIG. 2. As shown in FIG. 4, the USB 3.0 translation circuit 209 includes a USB 2.0 translator 401, a storage unit 403 and a USB 3.0 translator 405. The USB 2.0 translator 401 is coupled to the USB 2.0 control circuit 201, which is configured to translate the data to be translated from the USB 3.0 format into the USB 2.0 format. The storage unit 403 is coupled between the USB 2.0 translator 401 and the USB 3.0 translator 405, which is configured to store the data to be translated. In one embodiment, the storage unit 403 includes a control register unit (control register file, for example) and a first in first out (FIFO) storage unit. The storage unit 403 may be any type of registers and SRAMs. The USB 3.0 translator 405 is configured to translate the data to be translated from the USB 2.0 format into the USB 3.0 format.

In FIG. 4, the USB 3.0 control circuit 203 includes a USB 3.0 controller 407 and a USB 3.0 interface 409. The USB 3.0 interface 409 is coupled to the host 207, which is configured to manage data transmission between the USB 3.0 control circuit 203 and the host 207. The USB 3.0 controller 407 is coupled to the MCU 205 and the USB 3.0 translation circuit 209, wherein the USB 3.0 controller 407, under control of the MCU 205, may perform an emulation flow for a USB 3.0 device, so as to confirm a correct connection of the USB 3.0 device for the host 207. Furthermore, the USB 3.0 controller 407, under control of the MCU 205, may also send a response token to the host 207 in response to a USB 3.0 format transmission require token.

Figure 5:
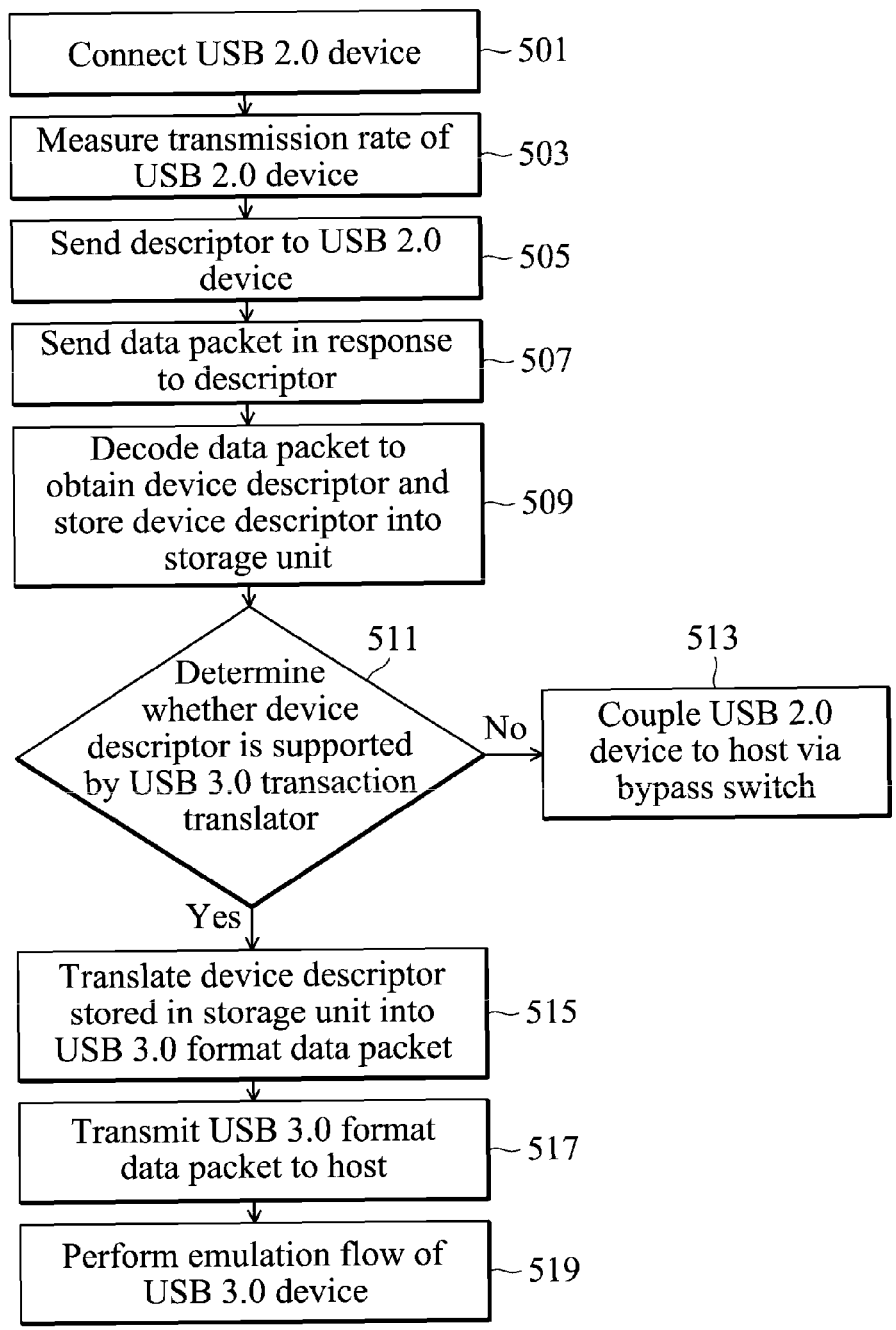
FIG. 5 shows a flowchart illustrating a USB 2.0 device, being translated into a USB 3.0 device by using the devices of FIGS. 2-4, such that connection of the USB 3.0 device may be detected by a host.

FIG. 5 shows a flowchart illustrating a USB 2.0 device, being translated into a USB 3.0 device by using the devices of FIGS. 2-4, such that connection of the USB 3.0 device may be detected by a host.

In step 501, the USB 2.0 device 211 is connected to the USB 2.0 interface 301.

In step 503, the USB 2.0 port controller 303 measures the transmission rate of the USB 2.0 device 211 and transmits the measured transmission rate to the MCU 205.

In step 505, the USB 2.0 serial interface engine 305, under control of the MCU 205, sends a descriptor to the USB 2.0 device 211.

In step 507, the USB 2.0 device 211 sends a data packet to the USB 2.0 serial interface engine 305 in response to the descriptor.

In step 509, the USB 2.0 serial interface engine 305 decodes the data packet to obtain a device descriptor corresponding to the data packet and stores the device descriptor into the storage unit 403.

In step 511, the MCU 205 reads the device descriptor stored in the storage unit 403 and determines whether the device descriptor is supported by the USB 3.0 transaction translator 20. If the USB 3.0 transaction translator 20 does not support the USB 2.0 device 211, step 513 is performed. In one embodiment, the USB 3.0 transaction translator 20 does not support the USB 2.0 device 211 when the USB 2.0 device 211 is a USB 2.0 HUB. If the USB 3.0 transaction translator 20 supports the USB 2.0 device 211, step 515 is performed.

In step 513, the USB 2.0 device 211 is coupled to the bypass switch 313 via the USB 2.0 interface 301 and then directly coupled to the host 207 through the bypass switch 313. At this time, the USB 2.0 device 211 can not be translated into a USB 3.0 device by the USB 3.0 transaction translator 20, and the USB 2.0 device 211 can only use a USB 2.0 protocol to perform data transmission.

In step 515, the USB 3.0 translator 405 translates the device descriptor stored in the storage unit 403 into a USB 3.0 format data packet and transmits the USB 3.0 format data packet to the USB 3.0 controller 407.

In step 517, the USB 3.0 controller 407 transmits the USB 3.0 format data packet to the host 207 via the USB 3.0 interface 409. Thus, the host 207 determines that a USB 3.0 device is connected.

In step 519, the USB 3.0 controller 407, under control of the MCU 205, performs an emulation flow for the USB 3.0 device. Thus, correct connection of the USB 3.0 device may be detected by the host 207, completing the flowchart.

Figure 6:
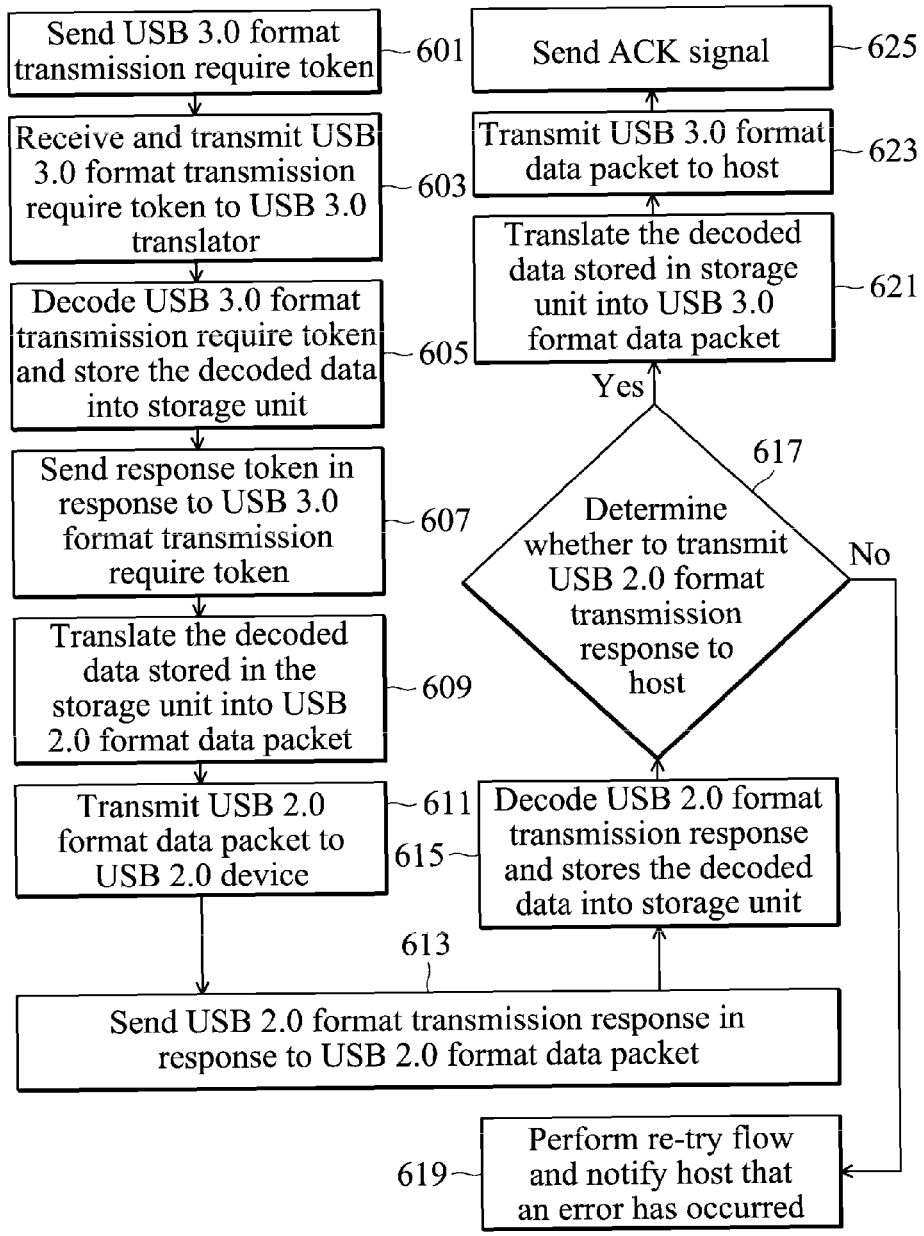
FIG. 6 shows a flowchart illustrating data transmission of the USB 2.0 device being performed according to a USB 3.0 protocol by using the devices of FIGS. 2-4.

FIG. 6 shows a flowchart illustrating data transmission of the USB 2.0 device being performed according to a USB 3.0 protocol by using the devices of FIGS. 2-4.

In step 601, the host 207 sends a USB 3.0 format transmission require token after detecting a correct connection of the USB 3.0 device.

In step 603, the USB 3.0 controller 407 receives the USB 3.0 format transmission require token via the USB 3.0 interface 409 and transmits the USB 3.0 format transmission require token to the USB 3.0 translator 405.

In step 605, the USB 3.0 translator 405 decodes the USB 3.0 format transmission require token and stores the packet ID and related data corresponding to the decoded USB 3.0 format transmission require token into the storage unit 403.

In step 607, the USB 3.0 controller 407, under control of the MCU 205, sends a response token to the host 207 in response to the USB 3.0 format transmission require token.

In step 609, the USB 2.0 translator 401 translates the packet ID and related data, stored in the storage unit 403 and corresponding to the decoded USB 3.0 format transmission require token, into a USB 2.0 format data packet and transmits the USB 2.0 format data packet to the USB 2.0 serial interface engine 305.

In step 611, the USB 2.0 serial interface engine 305 transmits the USB 2.0 format data packet to the USB 2.0 device 211 via the USB 2.0 interface 301.

In step 613, the USB 2.0 device 211 receives the USB 2.0 format data packet and sends a USB 2.0 format transmission response in response to the USB 2.0 format data packet.

In step 615, the USB 2.0 serial interface engine 305 receives the USB 2.0 format transmission response via the USB 2.0 interface 301, decodes the USB 2.0 format transmission response, and stores the packet ID and related data corresponding to the decoded USB 2.0 format transmission response into the storage unit 403.

In step 617, the MCU 205 controls the USB 2.0 serial interface engine 305 to send a flow control packet to the USB 2.0 device 211 and determines whether the USB 2.0 format transmission response does need to be transmitted to the host 207. When the USB 2.0 format transmission response does not need to be transmitted to the host 207, step 619 is performed. Otherwise, step 621 is performed.

In step 619, the MCU 205 performs a re-try flow and notifies the host 207 that an error has occurred.

In step 621, the USB 3.0 translator 405 translates the packet ID and related data, stored in the storage unit 403 and corresponding to the USB 2.0 format transmission response, into a USB 3.0 format data packet, and transmits the USB 3.0 format data packet to the USB 3.0 controller 407.

In step 623, the USB 3.0 controller 407 transmits the USB 3.0 format data packet to the host 207 via the USB 3.0 interface 409.

In step 625, the host 207 receives the USB 3.0 format data packet and sends an acknowledgement signal (ACK), completing the flowchart.

By using the USB 3.0 transaction translator of the invention, a USB 2.0 device can connect to a host through a point to point link. Thus, bandwidth for data transmission is increased. Furthermore, the USB 2.0 device is identified as a USB 3.0 device for the host. Thus, data throughput and transmission performance is increased, obtaining lower power consumption. Translating a USB 2.0 device into a USB 3.0 device is only an embodiment of the invention, and does not limit the invention. Those who are skilled in this technology can make similar translations for various serial transmission devices, so as to translate a low-speed device into a high-speed device, to increase performance of data transmission.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transmission system, comprising:
a second control circuit coupled to a host, receiving a second format data packet sent by the host;
a translation circuit coupled to the second control circuit, decoding the second format data packet sent by the host, and translating the decoded second format data packet into a first format data packet; and
a first control circuit coupled to the translation circuit, transmitting the first format data packet to a first device, and receiving a transmission response sent by the first device in response to the first format data packet;
wherein whether the transmission response needs to be transmitted to the host is determined by a micro control unit, and a re-try flow is performed when the transmission response does not need to be transmitted to the host, wherein a data transmission rate of the first device is slower than that of a second device, and the data transmission system is backward compatible to the first device, and the second format data packet is consistent with the second device,
wherein the first control circuit comprises: a signal quality adjustment circuit, programming the signal parameters of the first device via a micro control unit; and a timing control circuit, programming the transmission and re-try time intervals for the first format data packet.

2. The data transmission system as claimed in claim 1, wherein the translation circuit comprises:
- a first translator coupled to the host, decoding the second format data packet sent by the host to obtain the packet ID and data corresponding to the decoded second format data packet;
- a storage unit, storing the packet ID and data corresponding to the decoded second format data packet; and
- a second translator, translating the packet ID and data corresponding to the decoded second format data packet into the first format data packet,
- wherein the second format data packet is a second format transmission require token.

3. The data transmission system as claimed in claim 2, wherein the first control circuit comprises:
- a serial interface engine, transmitting the first format data packet to the first device and receiving the transmission response sent by the first device in response to the first format data packet,
- wherein the serial interface engine decodes the transmission response to obtain the packet ID and data corresponding to the decoded transmission response, and stores the packet ID and data corresponding to the decoded transmission response into the storage unit.

4. The data transmission system as claimed in claim 3, wherein the first translator translates the packet ID and data corresponding to the decoded transmission response to the second format data packet when the transmission response does need to be transmitted to the host.

5. The data transmission system as claimed in claim 1, wherein the first control circuit comprises:
- a serial interface engine, sending a descriptor to the first device and receiving a first format packet sent by the first device in response to the descriptor when the first device is coupled to the data transmission system.

6. The data transmission system as claimed in claim 5, wherein the serial interface engine decodes the first format packet to obtain a device descriptor.

7. The data transmission system as claimed in claim 6, wherein the translation circuit comprises:
- a storage unit, storing the device descriptor; and
- a first translator, translating the device descriptor into a second format packet.

8. The data transmission system as claimed in claim 7, wherein the second control circuit comprises:
- a controller, transmitting the second format packet to the host, so that the host determines that the second device is connected, and performing an emulation flow for the first device as the second device according to the second format packet, wherein the second device is not coupled to the first device.

9. A data transmission method for a data transmission system, comprising:
- receiving a second format data packet sent by a host;
- decoding the second format data packet sent by the host, and translating the decoded second format data packet into a first format data packet;
- transmitting the first format data packet to a first device;
- receiving a transmission response sent by the first device in response to the first format data packet;
- determining by a micro control unit whether the transmission response needs to be transmitted to the host; and
- performing a re-try flow when the transmission response does not need to be transmitted to the host,
- wherein a data transmission rate of the first device is slower than that of a second device, and the data transmission system is backward compatible to the first device, and the second format data packet is consistent with the second device; and
- programming the signal parameters of the first device; and
- programming the transmission and re-try time intervals for the first format data packet.

10. The data transmission method as claimed in claim 9, further comprising:
- decoding the second format data packet sent by the host to obtain packet ID and data corresponding to the decoded second format data packet;
- storing the packet ID and data corresponding to the decoded second format data packet; and
- translating the packet ID and data corresponding to the decoded second format data packet into the first format data packet, wherein the second format data packet is a second format transmission require token.

11. The data transmission method as claimed in claim 10, further comprising:
- decoding the transmission response to obtain the packet ID and data corresponding to the decoded transmission response; and
- storing the packet ID and data corresponding to the decoded transmission response.

12. The data transmission method as claimed in claim 11, further comprising:
- translating the packet ID and data corresponding to the decoded transmission response to the second format data packet when the transmission response does need to be transmitted to the host.

13. The data transmission method as claimed in claim 9, further comprising:
- sending a descriptor to the first device; and receiving a first format packet sent by the first device in response to the descriptor when the first device is coupled to the data transmission system.

14. The data transmission method as claimed in claim 13, further comprising:
- decoding the first format packet to obtain a device descriptor.

15. The data transmission method as claimed in claim 14, further comprising:
- storing the device descriptor; and
- translating the device descriptor into a second format packet.

16. The data transmission method as claimed in claim 15, further comprising:
- transmitting the second format packet to the host, so that the host determines that the second device is connected; and
- performing an emulation flow for the first device as the second device according to the second format packet, wherein the second device is not coupled to the first device.

17. The data transmission system as claimed in claim 1, wherein the micro control unit controls to send a flow control packet to the first device to determine whether the transmission response needs to be transmitted to the host.

18. The data transmission method as claimed in claim 9, wherein the micro control unit controls to send a flow control packet to the first device to determine whether the transmission response needs to be transmitted to the host.

* * * * *